United States Patent [19]

Pennington

[11] Patent Number: 4,720,377
[45] Date of Patent: Jan. 19, 1988

[54] METHOD FOR PRODUCING NITROUS OXIDE BY REACTING AMMONIA WITH A MOLTEN NITRATE SALT OF AN ALKALINE EARTH METAL

[75] Inventor: B. Timothy Pennington, Sulphur, La.

[73] Assignee: Olin Corporation, Cheshire, Conn.

[21] Appl. No.: 57,846

[22] Filed: Jun. 3, 1987

Related U.S. Application Data

[63] Continuation-in-part of Ser. No. 884,470, Jul. 11, 1986, abandoned.

[51] Int. Cl.$^4$ .............................................. C01B 21/22
[52] U.S. Cl. .................................... 423/400; 423/395; 423/579
[58] Field of Search ............... 423/385, 375, 400, 403, 423/579

[56] References Cited

U.S. PATENT DOCUMENTS

| | | | |
|---|---|---|---|
| 4,203,959 | 5/1980 | Münster | 423/400 |
| 4,225,455 | 9/1980 | Haas | 423/400 |
| 4,285,830 | 8/1981 | Müller | 423/405 |
| 4,367,204 | 1/1983 | Klopp et al. | 423/393 |
| 4,376,105 | 3/1983 | Matuda et al. | 423/400 |
| 4,564,510 | 1/1986 | Bechthold et al. | 423/395 |

OTHER PUBLICATIONS

Suwa, T., A. Matsushima, Y. Suziki and Y. Namina, "Synthesis of Nitrous Oxide by Oxidation of Ammonia," Kohyo Kagaku Zasshi, vol. 64, pp. 1879-1888, 1961.

Chemical Abstract 95(22); 189,494a, Czech. Patent CS 186,313, Nov. 30, 1973, J. Mikoda.

Kirk-Othmer's Encyclopedia of Chemical Technology, vol. 2, Third Edition, John Wiley & Sons, p. 527, 1978.

Fouzanfar, H., and D. H. Kerridge, *J. Inorg. Nucl. Chem.*, vol. 40, pp. 1327-1330, Dec. 14, 1977.

Primary Examiner—Helen M. S. Sneed
Assistant Examiner—Anthony McFarlane
Attorney, Agent, or Firm—Dale Lynn Carlson; Thomas P. O'Day

[57] ABSTRACT

This invention relates generally to a method for producing nitrous oxide, and more specifically, to a method of producing nitrous oxide by reacting ammonia with at least one molten nitrate salt of an alkaline earth metal.

18 Claims, No Drawings

METHOD FOR PRODUCING NITROUS OXIDE BY REACTING AMMONIA WITH A MOLTEN NITRATE SALT OF AN ALKALINE EARTH METAL

This is a continuation-in-part application of Ser. No. 884,470, filed on July 11, 1986, now abandoned.

FIELD OF THE INVENTION

This invention relates generally to a method for producing nitrous oxide, and more specifically, to a method of producing nitrous oxide by reacting ammonia with at least one molten nitrate salt of an alkaline earth metal.

BACKGROUND OF THE INVENTION

Nitrous oxide, which was discovered by Priestly in 1772, was found to have utility as an anesthetic by Davey in 1800. There are at least two conventional commercial methods for its production. By one method, nitrous oxide is produced catalytically from ammonia and air using pelletized Mn and Bi oxides as catalysts, reportedly with an 85 percent conversion of ammonia per single pass at 310°–350° C. This method is disclosed in a Japanese technical publication entitled "SYNTHESIS OF NITROUS OXIDE BY OXIDATION OF AMMONIA", by T. Suwa, A. Matsushima, Y. Suziki and Y. Namina in Kohyo Kagaku Zasshi, Vol. 64, pp. 1879–1888, 1961 and also in Czech. Patent CS 186,313, issued Nov. 30, 1973 to J. Mikoda, see Chemical Abstract 95(22); 189,494a. The feed gas composition used in this patent was calculated to contain about 2 percent ammonia in 98 percent air and the exit gas concentration of nitrous oxide was about 1 percent. On this basis, the nitrous oxide produced must be separated from a much larger volume of air, resulting in relatively high separation costs. In addition, this catalytic method for producing nitrous oxide from ammonia produces several by-product nitrogen compounds such as nitric oxide and nitrogen dioxide which necessitate additional separation steps.

The second conventional commercial method for the production of nitrous oxide involves the thermal decomposition of ammonium nitrate at about 170° C. according to the equation below:

$$NH_4NO_3 \rightarrow N_2O + 2H_2O.$$

This method is described in Kirk-Othmer's Encyclopedia of Chemical Technology, Volume 2, p. 527, (1978). Since ammonium nitrate is considered to be a high explosive, precautions must be taken to minimize the risk of explosion when using this production method, including feeding a concentrated aqueous solution of ammonium nitrate into a reactor at 275° C. However, any dry, molten ammonium nitrate in the system that becomes heated above 250° C. poses a detonation risk according to the equation:

$$NH_4NO_3 \rightarrow N_2 + \tfrac{1}{2}O_2 + 2H_2O.$$

Besides the above two commercial methods for making nitrous oxide, various laboratory methods have also been disclosed. For example, molten nitrate salts have been reported to react with ammonium chloride to produce nitrous oxide, chloride ion, and water according to the equation below:

$$NH_4Cl + NO_3^- \rightarrow Cl^- + 2H_2O + N_2O.$$

Such a reaction is reported in a technical publication by H. Fouzanfar and D. H. Kerridge in J. Inorg. Nucl. Chem., Volume 40, pp. 1327–1330. This reaction leaves a chloride ion residue in the melt and, with extensive reaction over time, the chloride can build up and actually convert the nitrate melt into a chloride melt. Moreover, the presence of chloride ion can lead to well-known corrosion problems with stainless steels and other conventional materials of reactor construction.

On the basis of the above, an inexpensive safe method for producing nitrous oxide would be highly desirable. Heretofore, such an inexpensive and safe method involving the use of molten nitrate salts has not been known or suggested to the knowledge of the present inventor.

SUMMARY OF THE INVENTION

In one aspect the present invention relates to a method for producing nitrous oxide by a reaction of ammonia with at least one molten nitrate salt of an alkaline earth metal at reaction conditions to produce said nitrous oxide.

In another aspect the present invention relates to a continuous method for producing nitrous oxide by the steps of:
(a) reacting ammonia with at least one molten nitrate salt of an alkaline earth metal at reaction conditions to produce said nitrous oxide, thereby converting at least a portion of said molten nitrate salt to molten nitrite salt,
(b) reconverting said molten nitrite salt to molten nitrate salt by reacting said molten nitrite salt with an oxidizing agent, and
(c) repeating steps (a) and (b) in a continuous manner.

DETAILED DESCRIPTION OF THE INVENTION

The method of the present invention is particularly advantageous in view of the high degree of specificity associated with this method in terms of nitrous oxide production. Unlike the above-described prior art production technique from ammonia, which generally produces by-products such as nitric oxide and/or nitrogen dioxide, the product streams associated with the method of the present invention generally contain only nitrous oxide, nitrogen, water, and recyclable ammonia, together with small amounts of hydroxide and nitrite. This specificity of nitrous oxide production in accordance with the method of the present invention is particularly important in view of the fact that the primary uses for nitrous oxide are as surgical anesthetics and as propellants for whipped cream in pressurized cannisters. These medical and food-type uses generally require high purity; and, hence, the technical advantage associated with a selective production process is readily apparent inasmuch as it obviates the need for repeated purification steps of the product stream.

Without wishing to be bound to any particular theory, it is believed that the reactions that occur for nitrous oxide production in accordance with the present invention are as follows:

$$2NH_3 + 4NO_3^- \rightarrow N_2O + 4NO_2^- + 3H_2O \quad \text{(a)}$$

$$NH_3 + NO_3^- \rightarrow N_2O + OH^- + H_2O \quad \text{(b)}$$

$$NH_3 + NH_2^- \rightarrow N_2 + OH^- + H_2O \qquad (c)$$

wherein the reaction in accordance with equation (a) generally predominates particularly when the process is carried out within the preferred range within the scope of the present range. Note that the molten nitrate salt is reduced to nitrite during the reaction as shown in equation (a). However, the molten nitrate salt can be readily regenerated by oxidizing the nitrite back to nitrate using an oxidizing agent. For example, air or another oxygen-containing gas, or dilute nitric acid, or mixtures thereof, can be sparged through the molten salt to effect this oxidation. The use of air is preferred since it is the least expensive oxidizing agent. By virtue of the regeneration of nitrate, a continuous process for the production of nitrous oxide in accordance with the present invention can be maintained.

Useful molten nitrate salts within the scope of the present invention include the salts of the alkaline earth metals, namely, magnesium, calcium, strontium, barium, and mixtures thereof, alone or in mixtures with one or more alkali metal molten nitrate salts, such as sodium and/or potassium. The preferred alkaline earth metals are calcium, magnesium, and mixtures thereof.

In accordance with the method of the present invention, the molten nitrate salt is generally maintained at a temperature sufficient to keep this salt in a molten condition. Thus, the required temperature will depend upon the melting point of the specific molten nitrate salt or mixture of molten nitrate salts selected. For example, some molten nitrate salt mixtures containing lithium nitrate can be in a molten state at a temperature as low as about 150° C. or lower, whereas other molten nitrate salts, such as cesium nitrate, can require a temperature of as high as about 500° C. or higher in order to maintain a molten state. Thus, a suitable operating temperature for the method of the present invention is selected based upon the melting point of the molten salt mixture selected, and is generally between about 150° C. and about 500° C., preferably between about 150° C. and about 490° C., more preferably between about 290° C. and about 400° C. This latter temperature range has been found to give a good conversion rate to the desired nitrous oxide product.

The process of the present invention is suitably carried out at atmospheric pressure. However, if desired, superatmospheric pressures of up to about 100 atmospheres, preferably between about 1 atmosphere and about 10 atmospheres, more preferably between about 1 atmopshere and about 4 atmospheres, or subatmospheric pressures, can be employed.

The product stream of the method of the present invention generally contains nitrous oxide, ammonia, nitrogen, and water. Separation of the nitrous oxide from the ammonia is suitably effected by conventional means, such as by bubbling the product stream through an acidic aqueous bath at atmospheric pressure. Separation of the nitrous oxide from nitrogen is suitably effected by passing the nitrous oxide/nitrogen stream through one or more water baths, under elevated pressure, as is well known in the art. See, for example, Czech. patent No. 161,502, issued November 15, 1975 to J. Mikoda which discloses a series of two water baths to effect this separation.

The ammonia feed gas can be separately passed into the molten nitrate salt-containing reactor, or the ammonia gas can be fed into the reactor together with an oxygen-containing gas, such as air. If air is used, it can be employed in an amount of up to about 50 volume percent based upon the total volume of ammonia and air in the feed gas. If an air-ammonia feed gas mixture is used, preferably the ammonia will be present in an amount of at least about 75 volume percent based upon the total volume of ammonia and air in the feed gas. Alternatively, the ammonia and the air or other oxygen-containing gas can be fed into the molten nitrate salt-containing reactor in separate gas streams. Among other functions, the oxygen in the oxygen-containing gas serves to increase the oxygen partial pressure in the molten salt, thereby assisting in the reconversion of molten nitrite salt into molten nitrate salt, as described above.

The ammonia-containing feed gas is preferably bubbled into the molten nitrate salt-containing reactor using a sparger. If used, the sparger is preferably positioned in the molten nitrate salt to a sparger exit port depth of between about 2 and about 1000 centimeters, preferably between about 10 and about 200 centimeters, depending upon the size of the reactor utilized and the overall depth of the molten salt in the reactor. Alternatively, the gas can be fed directly into the bottom of the reactor by a feed tube.

The ammonia-containing feed gas is preferably preheated prior to being fed into the reactor, although in the absence of preheat, the molten nitrate salt will rapidly heat the feed gas. If the feed gas is preheated, it preferably enters the reactor at a temperature of between about 100° C. and about 550° C. .

The following example is intended to illustrate, but in no way limit, the scope of the present invention.

PROPOSED EXAMPLE

A 6 Kg molten salt mixture consisting of 50 percent by weight calcium nitrate and 50 percent by weight strontium nitrate is heated to 375 degrees C. in a four-liter stainless steel reaction vessel equipped with a sparger tube immersed into the salt at a depth of 50 cm. Gaseous ammonia is sparged through the molten salt mixture at a rate of about 1000 cc/min. for one hour. The ammonia flows into the reactor at slightly above atmospheric pressure, and the product gas and unreacted ammonia exit the reactor at essentially atmospheric pressure. Analysis of the exit gas stream by gas cell infrared spectroscopy and gas chromatography methods shows that the major reaction product is nitrous oxide.

What is claimed is:

1. A method for producing nitrous oxide by a reaction of ammonia with at least one molten nitrate salt of an alkaline earth metal at reaction conditions to produce said nitrous oxide.

2. The method of claim 1 wherein said ammonia is in gaseous form.

3. The method of claim 2 wherein said reaction is carried out by contacting said ammonia with said molten nitrate salt by bubbling said ammonia through a bath of said molten nitrate salt.

4. The method of claim 3 wherein said bubbling of said ammonia is carried out using a sparging tube having an exit port positioned in said bath of said molten nitrate salt.

5. The method of claim 1 wherein said molten nitrate salt is selected from the group consisting of magnesium, calcium, strontium, and barium molten nitrate salts, and mixtures thereof.

6. The method of claim 1 wherein said reaction is carried out at atmospheric pressure.

7. The method of claim 1 wherein said reaction is carried out in a pressurized reactor at an elevated pressure of no greater than about 100 atmospheres.

8. A continuous method for producing nitrous oxide by the steps of:
(a) reacting ammonia with at least one molten nitrate salt of an alkaline earth metal at reaction conditions to produce said nitrous oxide, thereby converting at least a portion of said molten nitrate salt to molten nitrite salt,
(b) reconverting said molten nitrite salt to molten nitrate salt by reacting said molten nitrite salt with an oxidizing agent, and
(c) repeating steps (a) and (b) in a continuous manner.

9. The method of claim 8 wherein said oxidizing agent is an oxygen-containing gas.

10. The method of claim 8 wherein said ammonia is contacted with said molten nitrate salt by bubbling said ammonia through a bath of said molten nitrate salt.

11. The method of claim 10 wherein said bubbling of said ammonia is carried out using a sparging tube having an exit port positioned in said bath of said molten nitrate salt.

12. The method of claim 8 wherein said molten nitrate salt is selected from the group consisting of magnesium, calcium, strontium, and barium molten nitrate salts, and mixtures thereof.

13. The method of claim 8 wherein step (a) is carried out at atmospheric pressure.

14. The method of claim 8 wherein step (a) is carried out in a pressurized reactor at an elevated pressure of no greater than about 100 atmospheres.

15. The method of claim 8 wherein step (a) is effected in the presence of an oxygen-containing gas.

16. The method of claim 15 wherein said oxygen-containing gas is air.

17. The method of claim 8 wherein said ammonia is provided in the form of a gaseous ammonia-in-air mixture.

18. The method of claim 17 wherein said gaseous ammonia-and-air mixture comprises between about 20 and about 80 volume percent ammonia based upon the total volume of ammonia plus air in said mixture.

* * * * *

UNITED STATES PATENT AND TRADEMARK OFFICE
CERTIFICATE OF CORRECTION

PATENT NO. : 4,720,377
DATED : Jan. 19, 1988
INVENTOR(S) : B. Timothy Pennington It is certified that error appears in the above—identified patent and that said Letters Patent is hereby corrected as shown below:

On the front page of the patent, between "[63] Continuation-in-part of Ser. No. 884,470, Jul. 11, 1986, abandoned" and "."; delete "abandoned" and insert --now U.S. Patent No. 4,689,209--.

Signed and Sealed this

Fourth Day of June, 1991

Attest:

HARRY F. MANBECK, JR.

Attesting Officer

Commissioner of Patents and Trademarks